United States Patent [19]

Fujioka et al.

[11] Patent Number: 4,924,396
[45] Date of Patent: May 8, 1990

[54] WHEEL BEHAVIOR DETECTING SYSTEM

[75] Inventors: Hideaki Fujioka; Tatsuji Matsumoto, both of Itami, Japan

[73] Assignee: Sumitomo Electric Industries, Ltd., Osaka, Japan

[21] Appl. No.: 215,957

[22] Filed: Jul. 7, 1988

[30] Foreign Application Priority Data

Jul. 9, 1987 [JP] Japan .................................. 62-171813
Jun. 8, 1988 [JP] Japan .................................. 63-140988

[51] Int. Cl.$^5$ .................................................. B60T 8/32
[52] U.S. Cl. .................................. 364/426.03; 303/95; 180/197
[58] Field of Search .................. 364/426.02, 426.03, 364/426.01, 565, 566; 303/95, 104, 106; 180/197; 324/160–162

[56] References Cited

U.S. PATENT DOCUMENTS

| | | | |
|---|---|---|---|
| 3,717,384 | 2/1973 | Harned | 303/107 |
| 4,729,608 | 3/1988 | Fennel et al. | 303/106 |
| 4,736,994 | 4/1988 | Fennel et al. | 364/426.02 |
| 4,739,484 | 8/1988 | von Zanten | 364/426.02 |
| 4,780,818 | 10/1988 | Kubo | 364/426.02 |
| 4,794,538 | 12/1988 | Cao et al. | 364/426.02 |
| 4,797,825 | 1/1989 | Shimanuki et al. | 364/426.02 |

Primary Examiner—Thomas G. Black
Attorney, Agent, or Firm—Cushman, Darby & Cushman

[57] ABSTRACT

A traction control system, or an anti-lock brake system comprises a wheel behavior detecting system which comprises a coefficient calculating circuit for calculating, on the basis of output values from wheel speed detectors, a bad road coefficient A of representative of the road surface irregularity upon which the vehicle is moving, and a control variable filtering circuit for producing a filtered value Lm which exhibits a normal waveform when the bad road coefficient A is small and a filtered waveform when the bad road coefficient is great thereby keeping abrupt changes caused by the bad road from erroneously controlling the traction or antilock systems. With the wheel behavior detecting system used in the traction control system or the anti-lock brake system, a control command determining circuit responds to the output from the filtering circuit, that is, the control variable which has been modified, to determine the command necessary to control braking forces to be applied to the wheels.

16 Claims, 5 Drawing Sheets

WHEEL BEHAVIOR DETECTING SYSTEM

BACKGROUND OF THE INVENTION

1. Field of the Invention

The present invention generally relates to a system for detecting the behavior of automobile wheels and, more particularly, to a wheel behavior detecting system applicable in any anti-lock brake system traction control system designed to suppress excessive slippage and/or spinning of automobile wheels.

2. Description of the Prior Art

It frequently occurs that, when the automobile accelerator pedal is depressed too quickly while the automobile wheels are on a slippery road surface, the automobile wheels undergo such excessive spinning that a reduction in steering comfort and a loss of energy results. Attempts have hitherto been made, such as disclosed in any one of the Japanese Patent Applications No. 62-3802, No.61-287107 and No. 61-258867, to provide a traction control system which is designed to detect the occurrence of the actual or incipient wheel spinning by the utilization of a control variable Ft, represented by the following formula, to suppress the driving forces regardless of the extent to which the accelerator pedal is depressed:

$$Ft = Vd - Vn + d(Vd - Vn)/dt$$

wherein Vd represents the speed of rotation of the driven wheel or, simply, driven wheel speed, and Vn represents the speed of rotation of the non-driven wheel or, simply non-driven wheel speed.

On the other hand, it also frequently occurs that, when an abrupt braking is effected while the automobile is running on the slippery road surface, the braked wheels tend to undergo such excessive slippage that a lost of steering comfort produces an extremely dangerous condition. Therefore, attempts have also been made to provide an anti-lock brake system wherein a control variable Fa, represented by the following formula, is utilized to detect the occurrence of the actual or incipient wheel slippage to suppress the braking forces regardless of the extent to which the brake pedal is depressed:

$$Fa = (Vv - Vw) + d(Vv - Vw)/dt$$

wherein Vv represents the vehicle running speed and Vw represents the wheel speed.

In any one of the above discussed prior art systems, since the control variable Ft or Fa contains a differential of the wheel speeds, the control variable Ft or Fa tends to abruptly change when the automobile running on a rough and/or gravel road is accompanied by a slight irregular rotation of the wheels. If such an abrupt change of the control variable exceeds a predetermined threshold value, the system may determine that the excessive spinning or slippage is taking place actually or incipiently and demand that control be effected. However, where the slight irregular rotation occurs in the wheels without actual or incipient spinning or slipping, no control is needed and the automobile can resume its normal condition. Accordingly, what appears to be the actual or incipient occurrence of excessive spinning or slippage detected frequently when the automobile is running on a rough and/or gravel road, is not a true indication of such occurrence, but a pseudo occurrence of spinning or slippage which should not have been detected.

In order to avoid the detection of the pseudo-spinning or pseudo-slippage, the U.S. Pat. No. 3,717,384, for example, discloses the system wherein the threshold value is increased. According to the system disclosed in the above mentioned U.S. patent, it has however been found that the detection of the true locked condition (with which the system cannot resume a normal condition) occurring when the automobile is running on a bad road, such as a rough and/or gravel road tends to be delayed and the control to reduce the braking force tends to be effected a moment after the actual occurrence of the locked condition. Therefore, with the system of the above mentioned U.S. patent, problems associated with the behavior of the wheels often occur that the stability of the automobile being driven is lowered, the automobile undergoes excessive pitching, the deceleration of the automobile tends to be abruptly decreased, and so on.

SUMMARY OF THE INVENTION

The present invention has been devised to substantially eliminate the above discussed problems and is, therefore, directed to either a traction control system or an anti-lock brake system of a type which comprises wheel speed detecting means for detecting the speed of rotation of front left-hand and right-hand wheels and rear left-hand and right-hand wheels, a vehicle speed detecting means for detecting the speed of movement of a vehicle, a control variable calculating means operable on the basis of output values from the wheel speed detecting means and the vehicle speed detecting means to calculate a control variable F utilized to detect the occurrence of excessive wheel slippage or excessive wheel spinning which is represented by the difference in speed of rotation of the wheels relative to the speed of movement of the vehicle, a control command determining means operable in response to an output from the control variable calculating means to detect the occurrence of the excessive wheel slippage or excessive wheel spinning and then to determine a command necessary to control braking forces to be applied to the wheels, and actuator means operable in response to output values from the determining means to control the braking forces.

The present invention is intended to provide the traction control system or the anti-lock brake system of the type referred to above with a wheel behavior detecting system which comprises a coefficient calculating means for calculating, on the basis of the output values from the wheel speed detecting means, a bad road coefficient A representative of a surface irregularity of a road on which the vehicle is moving, and a control variable filtering means for filtering a value Lm which exhibits a waveform similar to the original waveform of the control variable F when the bad road coefficient A is small, but a waveform in which a component of abrupt change of the control variable F is removed when the bad road coefficient is great. With the wheel behavior-detecting system used in the traction control system or the anti-lock brake system, the control command determining means responds to the output from the filtering means, that is, the control variable which has been modified, to determine the command necessary to control braking forces to be applied to the wheels.

BRIEF DESCRIPTION OF THE DRAWINGS

The present invention will be described in detail in connection with preferred embodiments thereof with reference to the accompanying drawings, in which like parts are designated by like reference numerals and in which.

DETAILED DESCRIPTION OF THE EMBODIMENTS

The wheel behavior detecting system according to a first embodiment of the present invention as applied in the traction control system for suppressing the wheel spinning will first be described.

Figure 1:
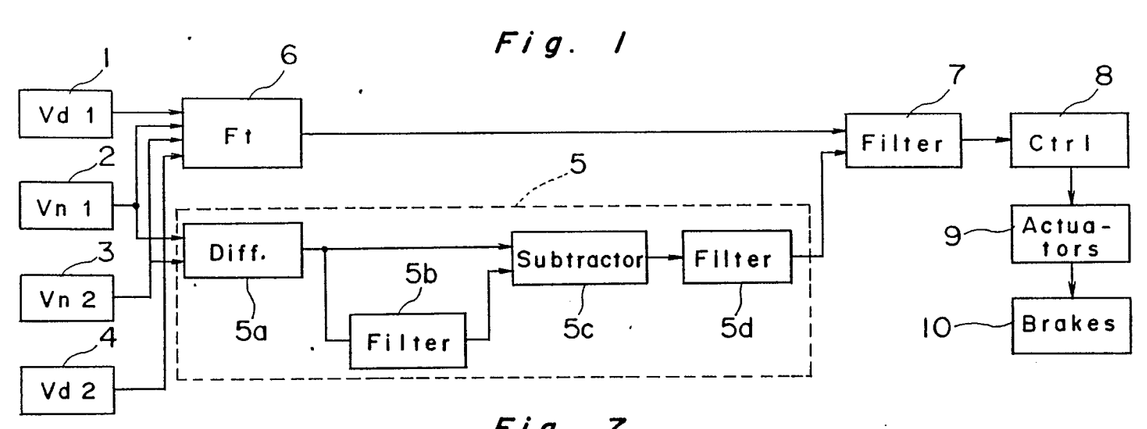
FIG. 1 is a block circuit diagram showing a wheel behavior detecting system according to a first preferred embodiment of the present invention as applied in the traction control system.

Referring first to FIG. 1, the system shown therein includes a plurality of, for example, four, wheel speed detectors 1, 2, 3 and 4 for detecting the respective speeds Vd1, Vn1, Vn2 and Vd2 of rotation of left-hand driven and non-driven wheels and right-hand non-driven and driven wheels, and a bad road coefficient calculating circuit 5 for calculating the degree of roughness of a bad road such as a bumpy road and/or a gravel road and outputting a bad road coefficient A. The bad road coefficient calculating circuit 5 is comprised of a differential circuit 5a, a first filter 5b, a subtractor 5c and a second filter 5d.

Figure 2A:
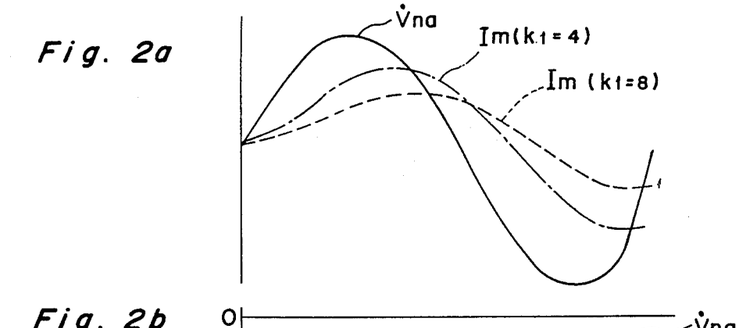
FIG. 2a is a diagram showing respective waveforms of input and output of a filter.

The differential circuit 5a, where at least one of the speeds of rotation of the left-hand and right-hand non-driven wheels and the speeds of rotation of both of the non-driven wheels which are not affected directly by a engine drive force, calculates a differential value Vna of the average value of both speeds and then outputs the result to the first filter 5b and to the subtractor 5c. The first filter 5b calculates and generates an output representative of a filtered value Im according to the following formula:

$$Im = I_{m-1} \cdot (k1-1)/k1 + C1 \cdot \dot{V}na$$

wherein $I_{m-1}$ represents the filtered value obtained during the preceding control cycle, k1 represents a predetermined degree and $C_1$ represents a constant which determines the unit of the filtered value Im and is expressed by 1/k1. For the degree k1, 8 or 4 is chosen. Assuming that the differential $\dot{V}na$ takes a value of a curve shown by the solid line in FIG. 2a, the filtered value Im varies as shown by the single-dotted line in FIG. 2a when k1 is 4, or as shown by the broken line in FIG. 2a when k1 is 8. In other words, the greater the value of k1 is, the more smooth the filtered value Im.

The subtractor 5c calculates the absolute value of the difference between respective outputs from the differential circuit 5a and the filter 5b and outputs the absolute value to the second filter 5d. The second filter 5d determines the average level at which the absolute value of the difference between the outputs from the differential circuit 5a and the first filter 5b lies, according to the following formula:

$$Jm = J_{m-1} \cdot (k2-1)/k2 + C2 \cdot |\dot{V}na - Im/(k1 \cdot C1)|$$

wherein $J_{m-1}$ represents the filtered value obtained during the preceding control cycle, k2 represents a predetermined degree and C2 represents a constant which is determinative of the unit of Jm and is subject to change according to the sign taken by the value of the following formula, said constant being chosen to be of a small value in proportion to the invariable consecutive number.

$$Im/(k1 \cdot C1)$$

More specifically, the value of $C_2$ is the product of the following coefficient multiplied by the following reference value.

| Consecutive Number | Coefficient |
| --- | --- |
| 1 | 1 |
| 2 | ¼ |
| 3 | ⅛ |
| Greater than 4 | 1/16 |

The value Jm so calculated according to the above formula is approximated to an integer with the use of the following formula and the integer so approximated is outputted as a bad road coefficient A.

$$A = INT(Jm/k4)$$

wherein k4 may be appropriately chosen.

Figure 2B:
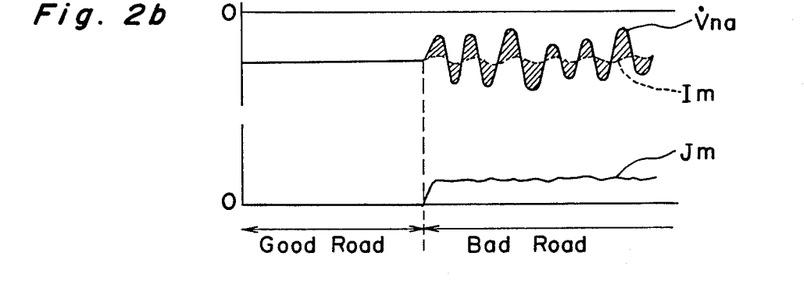
FIG. 2b is a diagram showing respective waveforms of output signals from first and second filters.

A specific example of the detection of the bad road coefficient A will now be described. When the automobile while running on a well-paved road as shown in an upper portion of FIG. 2b is braked, no substantial change is observed in the differential value $\dot{V}na$. However, when the automobile running on a bad road such as a gravel road or a rough road, the differential value $\dot{V}na$ fluctuates considerably. Therefore, as shown in a lower portion of FIG. 2b, when and so long as the automobile is running on the well-paved road with no differential value $\dot{V}na$ fluctuating substantially, the displacement of the differential value $\dot{V}na$ relative to $Im/(k1 \cdot C1)$ is small. However, this displacement varies considerably when and so long as the automobile is running on the bad road. In view of the foregoing, the value Im, which represents the center line of the fluctuating differential value V̇na, then is determined by the first filter 5b, followed by the determination by the subtractor 5c of the absolute value of an area hatched in FIG. 2b. Then, the second filter 5d is used to determine the value Jm which represents where this absolute value lies on average as shown in the lower portion of FIG. 2b, which value Jm is suitably approximated to the integer A which is in turn outputted from the second filter 5d as a signal representative of the bad road coefficient A. As can be understood from the foregoing, the bad road coefficient A increases with an increase of the roughness of the surface of the bad road.

Referring back to FIG. 1, the system also includes a control variable calculating circuit 6 for calculating a control variable Ft according to the following formula and then to output it:

$$Ft = Vd - Vn + d \cdot (Vd - Vn)/dt$$

wherein Vd represents the speeds of the driven wheels and Vn represents the speeds of the non-driven wheels.

Since in this case the wheel spinning takes place separately in the right-hand driven wheel and the left-hand driven wheel, it is preferred that the control variable Ft is calculated for each of the right-hand and left-hand driven wheels so that the right-hand and left-hand driven wheels can be independently braked. However, in the following description, no distinction is made between the left-hand and right-hand wheels for the purpose of general description of the present invention. It is, however, preferred in practice that what will be explained below should be provided for each of the right-hand and left-hand wheels or that what will be explained below should be alternately utilized on time-sharing basis to effectuate the control.

Both the second filter 5d and the calculating circuit 6 are connected to a third filter 7 which adjusts the control variable Ft according to the bad road coefficient A and calculates an output according to the following formula:

$$Lm = L_{m-1} \cdot (k1-1)/k3 + C3 \cdot Ft$$

wherein $L_{m-1}$ represents the filtered value obtained during the preceding control cycle, k3 represents a degree determined by the coefficient A and C3 represents a constant determinative of the unit of the value Lm which is 1/k3. It is to be noted that the degree k3 is chosen to be $2^A$. By way of example, where the bad road coefficient is small, for example, A=0, such as in the well-paved road, the degree k3 will be 1 and, therefore, the value Lm will become equal to the control variable Ft. Conversely, where the bad road coefficient is great, the control variable Ft can be according to the value of the coefficient a. In a particular situation as will be described later, the degree k3 may be $2 \times 2^A$.

The filtered value Lm calculated by the third filter 7, that is, the control variable Ft modified according to the bad road coefficient A, is supplied to a brake control 8 for use in decreasing, increasing and retaining braking forces, as will be described, through brake actuators 9 for controlling braking pressure, actual braking being performed by brakes 10.

In the foregoing description, any one of the first, second and third filters 5b, 5d and 7 may be employed in the form of a digital filter and, in such case, the curve shown by each of the broken lines and the single-dotted lines in FIG. 2a may exhibit a stepwise change.

Hereinafter, the operation of the wheel behavior detecting system according to the present invention will be described with reference to the flowchart shown in FIG. 3 and also to the waveform shown in FIG. 4.

Figure 3:
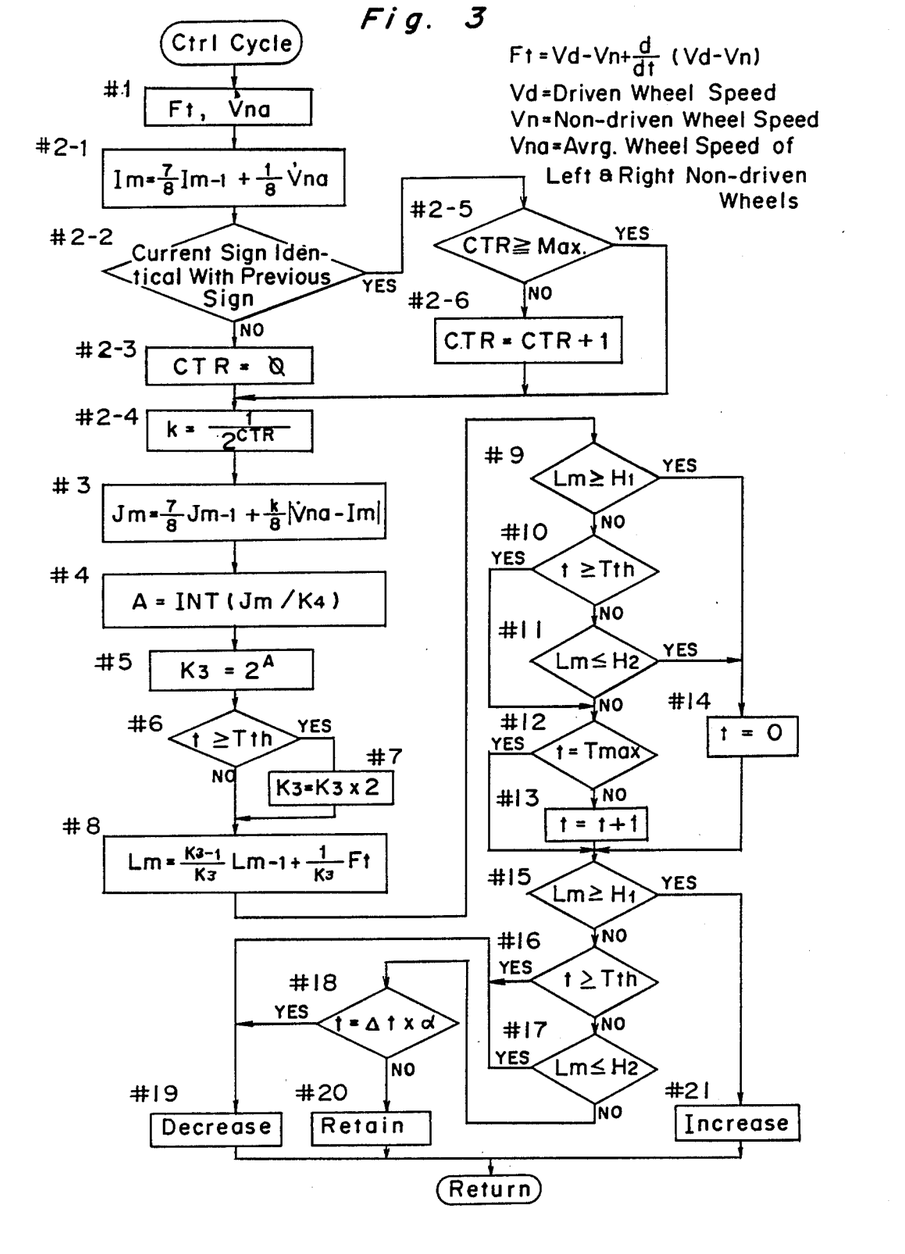
FIG. 3 is a flowchart showing the sequence of operation of the wheel behavior detecting system applied in the traction control system.

Referring to FIG. 3, at step #1, both the control variable Ft and the differential value V̇na of the average speed of rotation of the left-hand and right-hand non-driven wheels are calculated. The first filter value Im, the third filtered value Jm and the bad road coefficient A are calculated during the process flow from step #2-1 to step #2-6, at step #3 and at step #4, respectively, followed by the calculation of the degree k3 at step #5.

The traction control and the timer will now be described. During a period in which the control variable Ft shown by the waveform (b) in FIG. 4 exceeds the upper threshold value H1 in a positive direction, it is deemed that an excessive wheel spinning is taking place and, therefore, the traction control is executed to increase the braking force. However, during a period in which the control variable Ft exceeds the lower threshold value H2 in a negative direction, it is deemed that the wheel spinning has ceased and, therefore, the traction control is executed to restore the braking force, that is, to decrease the braking force. Where the control variable Ft is intermediate the upper and lower threshold values, the braking force is gradually decreased so that the next succeeding spinning may take place. As shown by the waveform (c) in FIG. 4, the timer starts its counting when the manipulation for increasing and decreasing the braking force has terminated and can be reset when the manipulation for increasing or decreasing the braking force incident to the excess of the control variable Ft over the threshold value H1 or H2. During the execution of the increase or decrease of the braking force, the counter is retained in a reset position. Also, the timer when having counted up to a maximum value Tmax retains the count. The details of the traction control are discussed in detail in, for example, the Japanese Patent Applications No. 61-258867, No. 61-287107 and No. 62-3802.

At step #6, a judgement is made to determine if the count t of the timer exceeds a predetermined threshold value Tth indicating the termination of the traction control. If the counter t exceeds the predetermined threshold value Tth, the degree k3 is doubled at step #7 prior to the program flow proceeding to stop #8. But if it does not exceeds, the program flow proceeds direct to step #8 at which the third filtered value Lm is calculated. It is to be noted that step #7 is a step carried out before the execution of the traction control for the purpose of increasing the degree k3 because, before the execution of the traction control, the detection sensitivity tends to be lowered. Although in the illustrated embodiment the degree k3 has been as doubled, it may be multiplied by any suitable integer greater than 1. The third filtered value Lm is generally equal to the control variable Ft during movement along the good road, but any considerable variation as compared with the control variable Ft is removed by the filtering effect during movement along the bad road. As shown by the waveform (d) in FIG. 4, the degree k3 determined by the bad road coefficient A may take a great value with an increase in the surface irregularity of the bad road and acts to increase the filtering effect. Accordingly, the considerable variation of the control variable Ft attributable exclusively to the surface irregularity of the bad road can be removed eliminating the erroneous manipulation of increasing or decreasing the braking force.

At step #9, a judgement is made to determine if the filtered value Lm exceeds the upper threshold value H1 in the positive direction. If it exceeds the upper threshold value H1 in the positive direction, it means that the manipulation for increasing the braking force should be carried out, and therefore, the program flow proceeds to step #14 at which the timer is reset. On the other hand, if the filtered value Lm does not exceed the upper threshold value H1 in the positive direction, another decision is made at step #10 to determine if the count value t exceeds the predetermined threshold value Tth. If the count value t exceeds the predetermined threshold value Tth, the program flow proceeds to step #12, but if it does not exceed, the program flow proceeds to step #11 at which a judgement is made to determine if the filtered value Lm exceeds the lower threshold value H2 in the negative direction. In the event that the filtered value Lm exceeds the lower threshold value H2 in the negative direction, it means that the braking force should be reduced and, therefore, the timer is reset at step #14. On the other hand, if the filtered value Lm does not exceed the lower threshold value H2 in the negative direction, a judgement is made at step #12 to determine if the count value t of the timer has attained the maximum value Tmax. In the event that the count value t does not yet attain the maximum count Tmax, the count up is carried out at step #13. During the execution of the program flow from step #9 to step #13, decisions are carried out whether to reset the timer, whether to retain at the maximum count value and whether to effect the count-up.

At step #15, a judgement is made to determine if the filtered value Lm exceeds the upper threshold value H1 in the positive direction. If it exceeds the upper threshold value H1, the traction control is executed at step #21 to increase the braking force, but if it does not exceed the upper threshold value H1, a judgement is made at step #16 to determine if the count value t of the counter attains the threshold value Tth. If the count value t attains the threshold value Tth, the traction control is terminated followed by step #19 at which the braking force is reduced without reserving any extra braking pressure. On the other hand, if the count value t does not attain the threshold value Tth, a decision is made to determine if the filtered value Lm exceeds the threshold value H2 in the negative direction. In the event that the filtered value Lm exceeds the threshold value H2 in the negative direction, the traction control is executed at step #19 to decrease the braking force. But if the result of decision is contrary thereto, the program flow proceeds to step #18. At step #18, a judgement is made to determine if the count value t of the timer is an integer multiple of $\Delta t$. Referring to the waveform (c) shown in FIG. 4, points at which the counter value t represents an integer multiple of $\Delta t$ are indicated by black-dotted circles. If the count value t of the timer is other than the integer multiple of $\Delta t$, the braking force is retained, but if it is the integer multiple thereof, the braking force is reduced by single-shot basis at such time. The foregoing operation is repeated.

The wheel behavior detecting system of the present invention can be equally applicable to the anti-lock brake system operable to suppress excessive wheel slippage, an example of which will now be described. In this embodiment, in the control variable calculating circuit 6 shown in FIG. 1, Fa is calculated, instead of the control variable Ft, according to the following formula:

$$Fa = (Vv - Vw) + d \cdot (Vv - Vw)/dt$$

wherein Vv represents the vehicle running speed and Vw represents the wheel speed. In such case, since the excessive slippage occurs separately in the wheels, the control variable Fa need be calculated for each of the left-hand front and rear wheels and the right-hand front and rear wheels. Other than the calculating circuit 6 being so constructed as hereinabove, the system is substantially identical with that shown in and described with reference to FIG. 1.

Figures 5A, 5B, 5C:
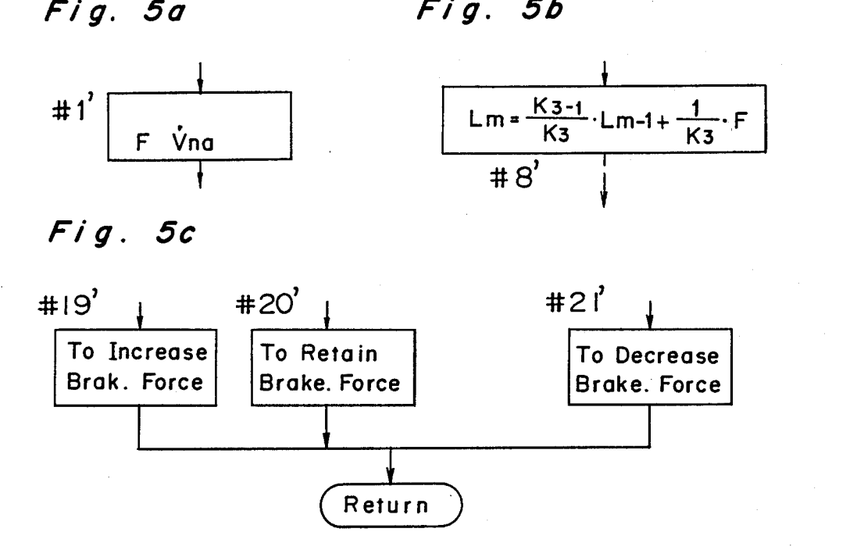
FIGS. 5a to 5c are fragmentary diagrams showing relevant portions of the steps of the flowchart of FIG. 3 that are necessitated to show the sequence of operation of the wheel behavior detecting system as applied in the anti-lock brake system, respectively.

With respect to the operation, it is substantially identical with that shown in and described with reference to FIG. 3 except that step #1, step #8, and steps #19 to #21, all shown in FIG. 3, have to be replaced with step #1', step #8' and steps #19' to #21' shown in FIG. 5a, FIG. 5b and FIG. 5c, respectively. This change is necessitated because the control variable is changed from Ft to Fa and also because the brake control carried out by the anti-lock brake system is in relationship opposite to that carried out by the traction control.

Figure 4:
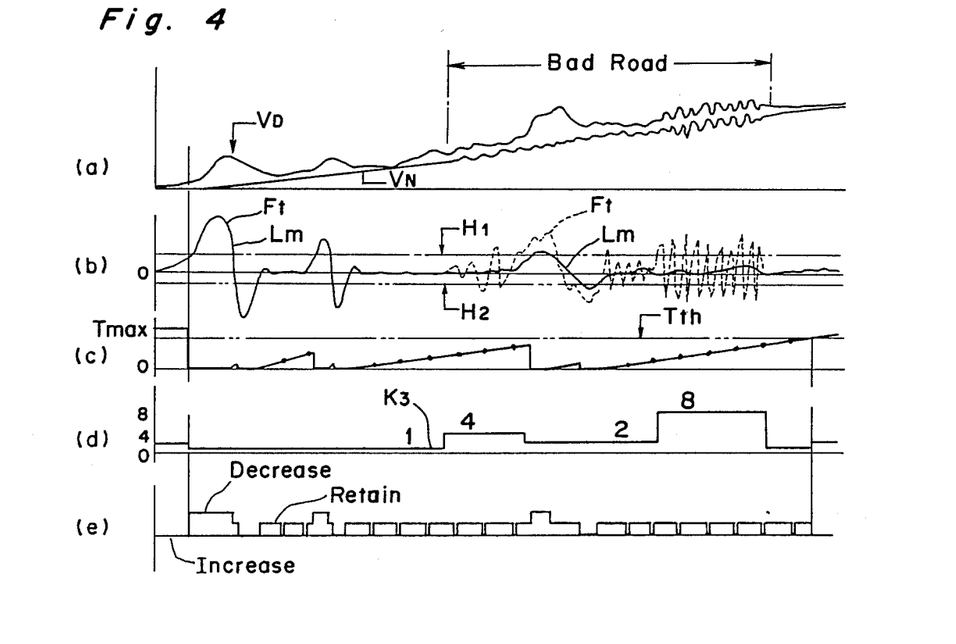
FIG. 4 is a diagram showing various waveforms illustrative of the execution of the traction control.
Figure 6:
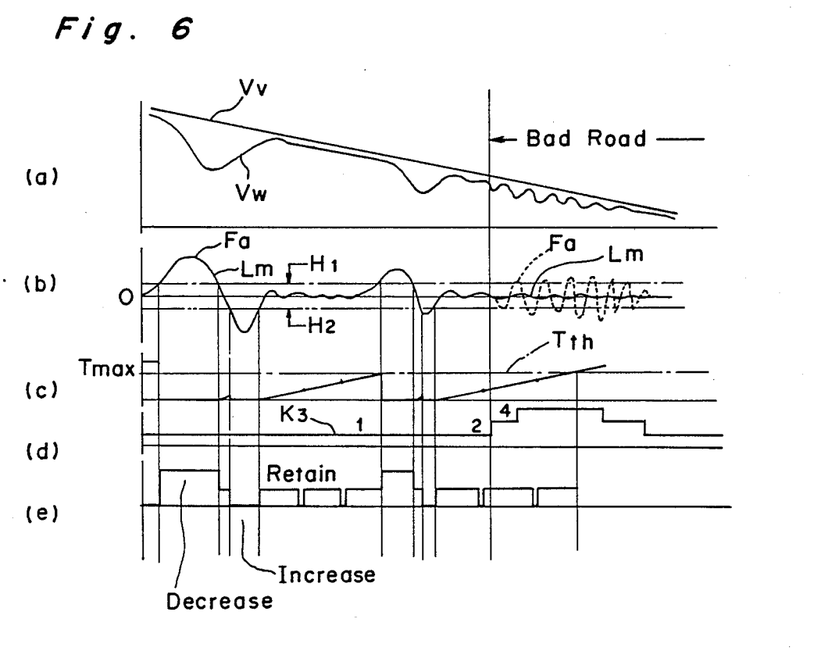
FIG. 6 is a diagram showing various waveforms illustrative of the execution of the anti-lock brake system.

With respect to the waveforms, they can be shown in a manner similar to those of FIG. 4 as can be understood from FIG. 6.

Figure 7:
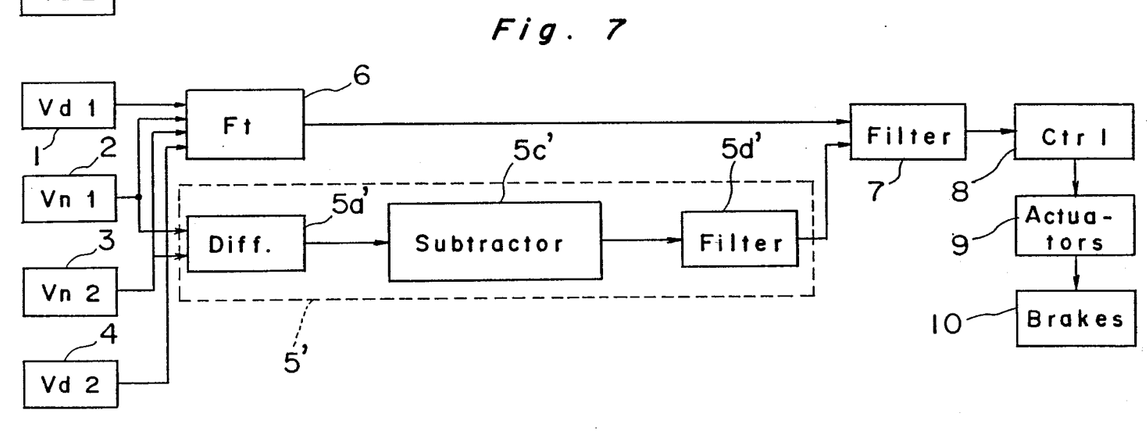
FIG. 7 is a circuit block diagram showing the wheel behavior detecting system according to a second preferred embodiment of the present invention as applied in the traction control system.
Figure 8:
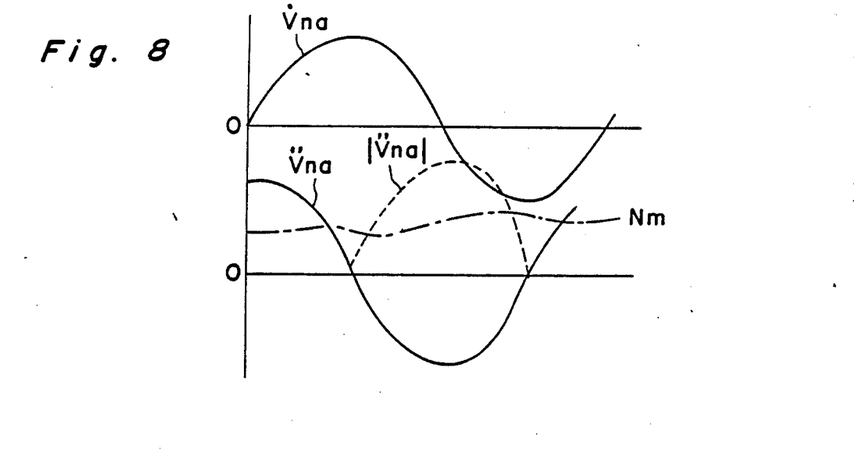
FIG. 8 is a diagram showing respective waveforms of input and output of the filter.
Figure 9:
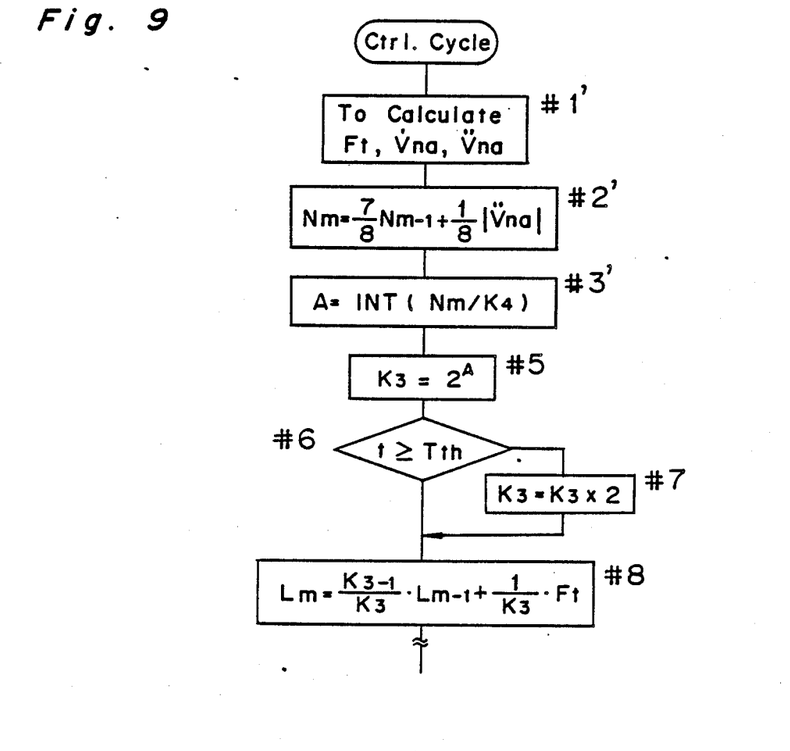
FIG. 9 is a fragmentary diagram showing a relevant portion of the flowchart showing the sequence of operation according to the second preferred embodiment of the present invention.

FIGS. 7 to 9 illustrate a second embodiment of the wheel behavior detecting system of the present invention. As is the case with the foregoing embodiment, the wheel behavior detecting system shown in FIGS. 7 to 9 can be equally applicable not only to the traction control system, but also to the anti-lock brake system.

The second embodiment of the present invention differs from the foregoing embodiment in that the first filter 5b used in the bad road coefficient calculating circuit shown in FIG. 1 is eliminated as shown in FIG. 7. More specifically, as shown in FIG. 7, the bad road coefficient calculating circuit 5' is comprised of the differential circuit 5a', the subtractor 5c' and the second filter 5d'. The differential circuit 5a' calculates the wheel speed differential value $\dot{V}n$ of at least one of the wheels of the vehicle, and outputs value $\dot{V}n$ to the subtractor 5c'. The subtractor 5c' calculates the absolute value of the differential value of time difference value $\dot{V}na$ of the wheel speed differential value $\dot{V}na$. The absolute value so calculated by the subtractor 5c' is supplied to the second filter 5d' which determines the level at which the absolute value lies on average according to the following formula;

$$Nm = (k-1) \cdot N_{m-1}/k + C_2 \cdot Vna$$

wherein k and C2 represent constants.

The value Nm is approximated to an integer according to the following equation, and the integer A is outputted as the bad road coefficient A.

$$A = INT \cdot (Nm/k4)$$

The detection of the bad road coefficient A by the bad road coefficient calculating circuit 5' will now be described with reference to FIG. 8. Assuming that the wheel speed differential value $\dot{V}na$ and the time difference value $\dot{V}na$ outputted from the differential circuit 5a' to the subtractor 5a' take respective values shown by the solid lines, the absolute value $|\dot{V}na|$ calculated by the subtractor 5c' varies as shown by the broken line and the filtered value Nm determined by the second filter 5d' varies as shown by the single-dotted line.

Since the remaining part of the wheel behavior detecting system according to the second embodiment of the present invention is substantially identical with that according to the foregoing embodiment, the details thereof will not reiterated for the sake of brevity.

With respect to the operation of the wheel behavior detecting system shown in FIG. 7, it differs from that shown in FIG. 1 only in that the program flow from step #1 to #4 of FIG. 3 is replaced by a program flow from step #1' to step #3' as shown in FIG. 9.

Referring now to FIG. 9, at step #1', both the control variable Ft and the differential value $\dot{V}na$ and the time difference value $\dot{V}na$ of the average speed of the left-hand and right-hand non-driven wheels are calculated. Then, the second filtered value Nm, the bad road coefficient A and the degree K3 are calculated at step #2', step #-3' and step #5, respectively. The program flow subsequent to step #5 is substantially identical with that shown in and described with reference to FIG. 3 and, therefore, the details are not reiterated for the sake of brevity.

It is to be noted that, as a means for determining the degree k3 for the bad coefficient A, the degree k3 may be determined according to the formula, $k3=T(A)$, in dependence on the bad road coefficient A in reference to a predetermined table, other than that hereinbefore discussed.

From the foregoing description of the present invention, it is clear that according to the present invention, since the pseudo-signal resulting from the bad road can be advantageously eliminated, any possible execution of the traction control or the anti-lock brake control resulting from the pseudo-signal can be avoided. Accordingly, vibration, pitching and/or reduction in acceleration and deceleration, which would occur in the vehicle body, providing with either the traction control system or the anti-lock brake system, during the running on the bad road can be avoided.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a traction control system including (a) wheel speed detecting means for detecting speeds of rotation of front left-hand and right-hand wheels and rear left-hand and right-hand wheels, (b) vehicle speed detecting means for detecting a speed of movement of a vehicle, (c) control variable calculating means for calculating variable F based on output values from said wheel speed a control detecting means and said vehicle speed detecting means, the control variable F being used to detect an occurrence of excessive wheel slippage represented by differences in the speeds of rotation of the wheels relative to the speed of movement of the vehicle, (d) control command determining means for determining a command for instructing braking forces to be applied to the wheels, and (e) actuator means for controlling the braking forces in response to an output value from said control command determining means, a wheel behavior detecting system comprising:

bad road coefficient calculating means for calculating a bad road coefficient A representative of a road surface irregularity upon which the vehicle is moving, the bad road coefficient A being calculated on the basis of output values from said wheel speed detecting means; and control variable filtering means for producing a filtered value Lm exhibiting a first waveform similar to a waveform of the control variable F when the bad road coefficient A is small and a second waveform in which abruptly changing components of the control variable F waveform are removed when the bad road coefficient A is large;

wherein said control command determining means responds to the filtered value Lm from said control variable filtering means.

2. The system as claimed in claim 1, wherein said bad rod coefficient calculating means comprises:

first filtering means for calculating a first filtered value Im according to the following formula, $$Im = I_{m-1} \cdot (K1-1)/[I_{m-1}] \, k1 + C1 \cdot \dot{V}na$$

wherein K1 represents a constant, C1 represents a constant, and $\dot{V}na$ represents a differential value of the speed of at least one non-driven wheel; and second filtering means for calculating a second filtered value Jm according to the following formula, $$Jm = J_{m-1} \cdot (k2-1)/k2 + C2 | \dot{V}na - Im/(k1 \cdot C1) |$$

wherein K2 and C2 represent constants, wherein said bad road coefficient A being is calculated from the second filtered value Jm.

3. The system as claimed in claim 1, wherein said bad road coefficient calculating means comprises a filtering means for calculating a filtered value Nm according to the following formula, $$Nm = N_{m-1} \cdot (k-1)/k + C2 \cdot | \dot{V}na |$$

where k and C2 represent constants, and Vna represents a differential value or a time difference value of a wheel speed differential value of at least one wheel, wherein said bad road coefficient A is calculated from the filtered value Nm.

4. The system as claimed in claim 2 wherein the constant C2 used to calculate the second filtered value Jm and the filtered value Nm is variable according to the sign of the value $\dot{V}na - Im/(k1 \cdot C1)$ and the value of $\dot{V}na$, respectively.

5. The system as claimed in claim 4, wherein the constant C2 is selected to be small in proportion to an invariable consecutive number and in accordance with a sign of the value $\dot{V}na - Im/(k1 \cdot C1)$ and the value $\dot{V}na$.

6. The system as claimed in claim 2 or claim 3, where the filtered value Jm or Nm is calculated for each wheel and two bad road coefficients A, one for each of the left-hand and right-hand wheels, are calculated from the smaller one of the filtered values Jm or Nm for the wheels on the same axles.

7. The system as claimed in claim 2 or claim 3, wherein the bad road coefficient A is calculated from the filtered value Jm or Nm for the non-driven wheels during a traction control for controlling the excess wheel spinning of the driven wheels, 8. The system as claimed in claim 2 or claim 3, wherein the filter value Jm or Nm is calculated for each wheel and two bad road coefficients A, one for each of the left-hand and right-hand wheels, are calculated from an average value of the filtered values Jm or Nm.

9. The system as claimed in claim 2, wherein the bad road coefficient A is calculated from the filtered value Jm or Nm calculated for each wheel.

10. The system as claimed in claim 2 wherein the bad road coefficient A is calculated according to the following formula, $$A = INT(Jm/k4), \text{ or}$$

$$A = INT(Nm/k4)$$

wherein k4 represents a constant.

11. The system as claimed in claim 10, wherein said control variable filtering means calculates a filtered value Lm according to the following formula, $$Lm = L_{m-1} \cdot (k3-1)/k3 + C3 \cdot F$$

wherein k3 represents a constant determined by the bad road coefficient A and C3 represents a constant.

12. The system as claimed in claim 11, wherein the constant k3 is calculated according to $k3 = 2^4$, during a period in which the traction control or anti-lock brake control is executed, or a predetermined period subsequent to the termination of such control.

13. The system as claimed in claim 11, wherein the constant k3 is calculated according to $k3 = k4 \cdot 2^4$, $k4 > 1$, during a period subsequent to the termination of the traction control or anti-lock brake control.

14. In a traction control system including (a) wheel speed detecting means for detecting speeds of rotation of front left-hand and right-hand wheels and rear left-hand and right-hand wheels, (b) vehicle speed depending means for detecting a speed of movement of a vehicle, (c) control variable calculating means for calculating a control variable F based on output values from said wheel speed detecting means and said vehicle speed detecting means, the control variable F being used to detect an occurrence of excess wheel spinning represented by differences in the speeds of rotation of the wheels relative to the speed of movement of the vehicle, (d) control command determining means for determining a command for instructing desired braking forces to the wheels, and (e) actuator means for controlling the braking forces in response to an output value from said control command determining means, a wheel behavior detecting system comprising:

bad road coefficient calculating means for calculating a bad road coefficient A, said bad road coefficient calculating means comprising:

First filtering means for calculating a first filtered value Lm according to the following formula, $$Im = I_{m-1} \cdot (k1-1)/k1 + C1 \cdot Vna$$

wherein k1 represents a constant, C1 represents a constant, and Vna represents a differential value of the speed of at least one non-driven wheel; and second filtering means for calculating a second filtered value Jm according to the following formula, $$Jm = J_{m-1} \cdot (k2-1)/k2 + C2 |Vna - Im/(k1 \cdot C1)|$$

wherein k2 and C2 represent constants;

wherein the bad road coefficient A is calculated from the second filtered value Jm; and control variable filtering means for producing a filtered value Lm according to the following formula, $$Lm = L_{m-1} \cdot (k3-1)/k3 + C3 \cdot F$$

wherein k3 represents a constant determined by the bad road coefficient A and C3 represents a constant;

wherein said control command determining means responds to the filtered value Lm from said control variable filtering means.

15. In a traction control system including (a) wheel speed detecting means for detecting speeds of rotation of front left-hand and right-hand wheels and rear left-hand and right-hand wheels, (b) vehicle speed detecting means for detecting a speed of movement of a vehicle, (c) control variable calculating means for calculating a Control variable based on output values from said wheel speed detecting means and said vehicle speed detecting means, the control variable F used to detect and occurrence of excessive wheel slippage represented by differences in the speeds of rotation of the wheels relative to the speed of movement of the vehicle, (d) control command determining means for determining a command for instructing braking forces to be applied to the wheels, and (e) actuator means for controlling the braking forces in response to an output value from said control command determining means, a wheel behavior detecting system comprising:

bad road coefficient calculating means for calculating a bad road coefficient A, said bad road coefficient calculating means comprising:

a filtering means for calculating a filtered value Nm according to the following formula, $$Nm = N_{m-1} / \cdot (k-1)/k + C2 \cdot |\ddot{V}na|$$

where k and C2 represent constants, and Vha represents a differential value or a time difference value of a wheel speed differential value of at least one wheel;

wherein said bad road coefficient A is calculated from the filtered value Nm; and control variable filtering means for producing a filtered value Lm according to the following formula, $$Lm = L_{m-1} \cdot (k3-1)/k3 + C3 \cdot F$$

wherein k3 represents a constant determined by the bad road coefficient A and C3 represents a constant;

wherein said control command determining means responds to the filtered valve Lm from said control variable filtering means.

16. The system as claimed in claim 14 or 15, wherein the bad road coefficient A is calculated according to the following formula, $$A = INT(Jm/k4), \text{ or}$$

$$A = INT(Nm/k4)$$

wherein k4 represents a constant.

* * * * *